United States Patent
Chin et al.

(10) Patent No.: US 11,184,909 B2
(45) Date of Patent: Nov. 23, 2021

(54) METHOD AND APPARATUS FOR HANDLING OVERLAPPING PUSCH DURATIONS

(71) Applicant: FG Innovation Company Limited, Tuen Mun (HK)

(72) Inventors: Heng-Li Chin, Taipei (TW); Chia-Hung Wei, Hsinchu (TW); Yu-Hsin Cheng, Hsinchu (TW); Wan-Chen Lin, Hualien (TW)

(73) Assignee: FG Innovation Company Limited, Tuen Mun (HK)

(*) Notice: Subject to any disclaimer, the term of this patent is extended or adjusted under 35 U.S.C. 154(b) by 0 days.

(21) Appl. No.: 16/833,109

(22) Filed: Mar. 27, 2020

(65) Prior Publication Data

US 2020/0314883 A1    Oct. 1, 2020

Related U.S. Application Data

(60) Provisional application No. 62/824,316, filed on Mar. 27, 2019.

(51) Int. Cl.
*H04W 72/12* (2009.01)
*H04L 5/00* (2006.01)
(Continued)

(52) U.S. Cl.
CPC ....... *H04W 72/1273* (2013.01); *H04L 1/1819* (2013.01); *H04L 5/0094* (2013.01); *H04W 72/14* (2013.01); *H04W 80/02* (2013.01)

(58) Field of Classification Search
CPC ... H04L 5/0062; H04L 5/0094; H04L 1/1519; H04L 1/1887; H04W 72/1242; H04W 72/1273; H04W 72/14
See application file for complete search history.

(56) References Cited

U.S. PATENT DOCUMENTS

2017/0026912 A1*  1/2017  Lee .................... H04W 52/346
2019/0110311 A1*  4/2019  Falconetti ......... H04W 72/0453
(Continued)

FOREIGN PATENT DOCUMENTS

| CN | 107241805 A | 10/2017 |
| CN | 108521885 A | 9/2018 |
| WO | 2018028530 A1 | 2/2018 |

OTHER PUBLICATIONS

Nokia etc., 3GPP TSG-RAN WG1, #96, R1-1903535, Summary of Wednesday offline discussion on UL/DL intra-UE prioritization/multiplexing, Feb. 27, 2019(Feb. 27, 2019), sections 2.2, 2.3 and Appendix B.

(Continued)

*Primary Examiner* — Gary Mui
(74) *Attorney, Agent, or Firm* — ScienBiziP, P.C.

(57) ABSTRACT

A method for uplink (UL) transmission performed by a UE is provided. The method includes: performing an UL transmission during a first PUSCH duration; receiving a PDCCH that schedules a second PUSCH duration; determining that the first PUSCH duration overlaps with the second PUSCH duration in a time domain; determining that the second PUSCH duration is prioritized over the first PUSCH duration; and cancelling the ongoing UL transmission during the first PUSCH duration starting from a preconfigured time period after an end of the PDCCH that schedules the second PUSCH duration.

14 Claims, 7 Drawing Sheets

(51) Int. Cl.
  *H04W 80/02*  (2009.01)
  *H04W 72/14*  (2009.01)
  *H04L 1/18*   (2006.01)

(56) References Cited

U.S. PATENT DOCUMENTS

| | | | |
|---|---|---|---|
| 2019/0116611 A1* | 4/2019 | Lee | H04W 72/1278 |
| 2019/0159134 A1* | 5/2019 | Wang | H04L 5/0053 |
| 2019/0289622 A1* | 9/2019 | Chatterjee | H04W 72/14 |
| 2019/0327755 A1* | 10/2019 | Xiong | H04L 5/0055 |
| 2020/0146045 A1* | 5/2020 | Loehr | H04L 5/0048 |
| 2020/0154469 A1* | 5/2020 | Chin | H04L 1/18 |
| 2020/0236582 A1* | 7/2020 | Chin | H04W 72/14 |
| 2020/0259601 A1* | 8/2020 | Zhou | H04L 5/0085 |
| 2020/0259896 A1* | 8/2020 | Sachs | G07C 9/00174 |
| 2020/0260478 A1* | 8/2020 | Yang | H04W 72/042 |
| 2020/0267749 A1* | 8/2020 | Al-Imari | H04L 5/0044 |
| 2020/0267773 A1* | 8/2020 | Islam | H04W 56/001 |
| 2020/0296716 A1* | 9/2020 | Lin | H04W 72/0413 |
| 2020/0314681 A1* | 10/2020 | Kuo | H04W 28/0252 |
| 2020/0337072 A1* | 10/2020 | Lunttila | H04W 72/1268 |
| 2021/0029733 A1* | 1/2021 | Takeda | H04W 24/10 |
| 2021/0211241 A1* | 7/2021 | Xiong | H04L 1/1896 |

OTHER PUBLICATIONS

Ericsson, 3GPP TSG-RAN WG1, Meeting#94bis, R1-1810317, Intra-UE Prioritization and Multiplexing of UL Transmissions, Sep. 28, 2018(Sep. 28, 2018), sections 1-3.

* cited by examiner

500

600

METHOD AND APPARATUS FOR HANDLING OVERLAPPING PUSCH DURATIONS

CROSS-REFERENCE TO RELATED APPLICATION(S)

The present disclosure claims the benefit of and priority of provisional U.S. Patent Application Ser. No. 62/824,316, filed on Mar. 27, 2019, entitled "Intra-UE uplink prioritization between configured grant and dynamic grant" ("the '316 provisional"). The disclosure of the '316 provisional is hereby incorporated fully by reference into the present disclosure.

FIELD

The present disclosure is related to wireless communication, and more particularly, to a method for handling overlapping physical uplink (UL) shared channel (PUSCH) durations in cellular wireless communication networks.

BACKGROUND

Various efforts have been made to improve different aspects of wireless communications, such as data rate, latency, reliability and mobility, for cellular wireless communication systems (e.g., fifth generation (5G) New Radio (NR)). An UL grant transmitted from a base station (BS) to a user equipment (UE) allocates a PUSCH duration (also referred to as PUSCH resource) for the UE to perform an UL data transmission. In NR, the UL grant may be a dynamic UL grant (also referred to as dynamic grant or DG) or a configured UL grant (also referred to as configured grant or CG). A DG may be referred to as a Downlink (DL) Control Information (DCI) format/message that schedules a PUSCH duration.

The UE may receive a DCI format/message on a physical downlink control channel (PDCCH). The DCI that schedules the PUSCH duration may contain information such as a hybrid automatic repeat request (HARQ) process ID and a New Data Indicator (NDI). A CG may correspond to one or more PUSCH durations.

Multiple PUSCH durations allocated to the UE may overlap in the time domain. A PUSCH duration allocated by an activated CG may fully or partially overlap with another PUSCH duration allocated by a DG in the same serving cell of the UE. There is a need in the industry for an improved and efficient mechanism for the UE to handle overlapping between multiple PUSCH durations.

SUMMARY

The present disclosure is directed to a method for UL transmission performed by a UE in cellular wireless communication networks.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to: perform an UL transmission during a first PUSCH duration; receive a PDCCH that schedules a second PUSCH duration; determine that the first PUSCH duration overlaps with the second PUSCH duration in a time domain; determine that the second PUSCH duration is prioritized over the first PUSCH duration; and cancel the ongoing UL transmission during the first PUSCH duration starting from a preconfigured time period after an end of the PDCCH that schedules the second PUSCH duration.

According to another aspect of the present disclosure, a method for UL transmission performed by a UE is provided. The method includes: performing an UL transmission during a first PUSCH duration; receiving a PDCCH that schedules a second PUSCH duration; determining that the first PUSCH duration overlaps with the second PUSCH duration in a time domain; determining that the second PUSCH duration is prioritized over the first PUSCH duration; and cancelling the ongoing UL transmission during the first PUSCH duration starting from a preconfigured time period after an end of the PDCCH that schedules the second PUSCH duration.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

DETAILED DESCRIPTION

Figure 1:
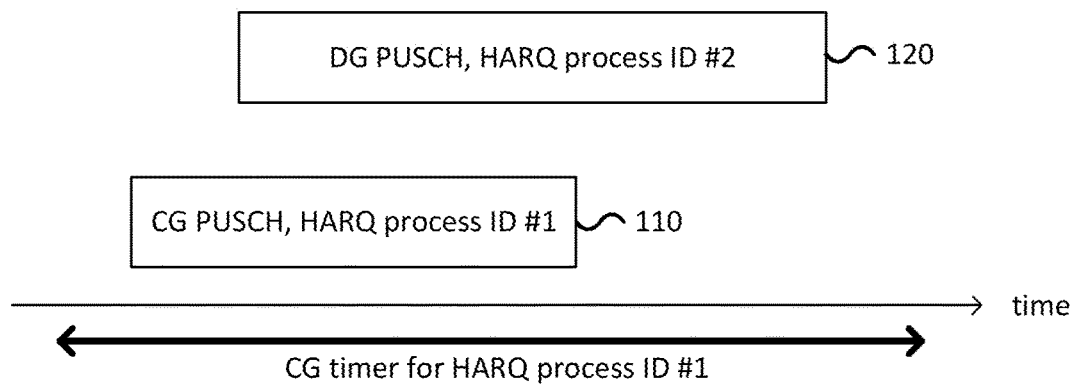
FIG. 1 includes a diagram illustrating a scenario in which a PUSCH duration indicated by a DG overlaps another PUSCH duration of a CG according to an example implementation of the present disclosure.

The following description contains specific information related to implementations of the present disclosure. The drawings and their accompanying detailed description are merely directed to implementations.

However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the drawings. However, the features in different implementations may be different in other respects and shall not be narrowly confined to what is shown in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that multiple relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the present disclosure. In other examples, detailed description of well-known methods, technologies, systems, and architectures are omitted so as not to obscure the description with unnecessary details.

Persons skilled in the art will recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the present disclosure is directed to software installed and executing on computer hardware, alternative implementations as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions.

The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

In one implementation, when a PUSCH duration allocated by a DG overlaps in the time domain with another PUSCH duration allocated by a CG, the PUSCH duration allocated by the DG may be prioritized over the PUSCH duration allocated by the CG. In this implementation, the UE may apply the PUSCH duration indicated by the DG for a medium access control (MAC) protocol data unit (PDU) transmission and skip the transmission on the PUSCH duration indicated by the CG.

However, when considering an Industrial Internet of Things (IIoT) scenario, the priority of a PUSCH indicated by a DG may not always be higher than a PUSCH duration of an activated CG. For example, an industrial node (e.g., autonomous robot) may generate periodic delay-sensitive packets.

The delay requirement may be strict and may not be fulfilled by a DG, which may require a UE to inform the network of a need for UL resource(s) such as PUSCH resource(s) via a scheduling request (SR)/buffer status report (BSR) and the corresponding DG allocated by the network. Hence, a BS (e.g., a gNB) may activate a CG configuration with short periodicity if it has the knowledge related to when the periodic delay-sensitive packets may arrive. As such, the UE may not need to inform the network of the need of UL resource(s) (e.g., PUSCH resource(s)) via SR/BSR, which causes extra delay. In this case, the PUSCH durations of this CG may have a higher priority than the PUSCH duration indicated by the DG whenever resource conflict occurs. In the present disclosure, resource conflict occurs when two or more PUSCH durations partially or fully overlap in the time domain. In this sense, the periodic delay-sensitive packets may be transmitted on the PUSCH duration indicated by the CG. Based on the abovementioned example scenario, some prioritization rules may be needed in the MAC and/or the Physical (PHY) layer of a UE, such that the UE may determine whether to skip the PUSCH duration corresponding to the CG or skip the PUSCH duration indicated by the DG when resource conflict occurs.

Case 1: Conditions to Determine PUSCH Duration Conflict

Conditions in cases 1-1 through 1-3 allow a MAC entity or a HARQ entity of the UE to identify whether conflict between PUSCH durations in the time domain occurs.

Subsequently, a prioritization decision between the conflicting PUSCH durations may be performed. Such prioritization may be also referred to as an intra-UE UL prioritization.

Case 1-1: MAC Entity Determines Resource Conflict

When receiving a DG on a PDCCH (e.g., DCI) for initial transmission (e.g., NDI provided in the DCI has been toggled compared to the value of the previous transmission that uses the same HARQ process as the received DG), the MAC entity may subsequently determine whether the PUSCH duration indicated by the DG for initial transmission conflicts in the time domain with a PUSCH duration of an activated CG for initial transmission or retransmission in the same serving cell. In one implementation, the PUSCH duration of an activated CG for retransmission may be scheduled via a DG (e.g., a DCI addressed to a configured scheduling radio network temporary identifier (CS-RNTI) and the NDI is not toggled compared to a value of the previous transmission that uses the same HARQ process indicated in the DCI) or configured via radio resource control (RRC) signaling (e.g., an information element (IE) that enables repetition of PUSCH duration(s) of an activated CG, if configured and with a value greater than 1).

If the MAC entity determines that resource conflict occurs, the MAC entity may prioritize one of the conflicting PUSCH durations. Only the prioritized PUSCH duration may be used for transmission.

Case 1-2: HARQ Entity Determines Resource Conflict

After the HARQ entity receives a DG for retransmission (e.g., DCI addressed to cell-RNTI (C-RNTI)) on a PDCCH from the MAC entity, the HARQ entity may subsequently determine whether the PUSCH duration indicated by this DG for retransmission conflicts with a PUSCH duration of an activated CG for either initial transmission or retransmission in the same serving cell. In one implementation, the PUSCH duration of the activated CG for retransmission may be scheduled by a DG (e.g., a DCI addressed to CS-RNTI and the NDI is not toggled compared to a value of a previous transmission that uses the same HARQ process indicated in the DCI) or configured via RRC signaling (e.g., an IE that enables repetition PUSCH duration(s) of an activated CG, if configured and with a value greater than 1).

If the HARQ entity determines that resource conflict occurs, the HARQ entity may prioritize one of the conflicting PUSCH durations. Only the prioritized PUSCH duration may be used for transmission.

Case 1-3: HARQ Entity Determines Resource Conflict

After the HARQ entity receives a DG, i.e., DG1, which schedules a resource for CG retransmission (e.g., a DCI addressed to CS-RNTI and the NDI is not toggled compared to a value of a previous transmission that uses the same HARQ process indicated in the DCI) from the MAC entity, the HARQ entity may subsequently determine whether the PUSCH duration indicated by this DG (i.e. DG1) conflicts with a PUSCH duration indicated by another DG (i.e. DG2) for either initial transmission or retransmission in the same serving cell. DG2 that schedules the PUSCH duration for initial transmission may be addressed to C-RNTI and the NDI provided in the DCI has been toggled compared to the value of the previous transmission that uses the same the HARQ process as DG2. In another implementation, DG2 that schedules the PUSCH duration for retransmission may be addressed to C-RNTI and the NDI provided in the DCI has not been toggled compared to the value of the previous transmission that uses the same the HARQ process as DG2. Only the prioritized PUSCH duration may be used for transmission.

In the implementations in cases 1-1 through 1-3, one of the conflicting resources is a PUSCH indicated by a DG and the other of the conflicting resources is a PUSCH of an activated CG. Implementations similar to cases 1-1 through 1-3 may be also applied when both the conflicting resources are PUSCHs indicated by different DGs or both of the conflicting resources are PUSCHs of different CG configurations.

Case 2: Prioritization Performed by MAC Entity/HARQ Entity

The prioritization performed by the MAC entity/HARQ entity may consider at least one of several factors. The factors include logical channel prioritization (LCP) mapping restrictions of the logical channel (LCH) (e.g., parameters allowedServingCells, allowedSCS-List, maxPUSCH-Duration, configuredGrantType1Allowed configured in an IE LogicalChannelConfig), a parameter priority configured in the IE LogicalChannelConfig, data availability, a data rate provided to one logical channel before allocating any resource to a lower-priority logical channel (e.g., a parameter prioritisedBitRate), whether the UE supports skipping UL transmission for an UL grant indicated on a PDCCH if no data is available for transmission (e.g., a parameter skipUplinkTxDynamic), the number of repetitions configured for the PUSCH duration (e.g., parameters pusch-AggregationF actor and repK), LCP mapping restriction of the MAC Control Element (CE), priority level of the MAC CE, whether a configured grant timer is running, $B_j$ (a variable maintained for each logical channel in the LCP procedure) and Packet Data Convergence Protocol (PDCP) duplication.

Case 2-1: Prioritization Based on Configured Grant Timer

If the MAC entity/HARQ entity identifies that a resource conflict occurs between a PUSCH duration of an activated CG and a PUSCH duration indicated by a DG, the MAC entity/HARQ entity may determine whether a configured grant timer (e.g., configuredGrantTimer) corresponding to the activated CG has been configured. If the configured grant timer (also referred to as CG timer) has been configured, the MAC entity/HARQ entity may then check whether the CG timer that corresponds to the HARQ process of the PUSCH duration of the activated CG is running. The MAC entity/HARQ entity may prioritize the PUSCH duration indicated by the DG if the CG timer corresponding to the HARQ process of the PUSCH duration of the activated CG has been configured and is running since the HARQ process of the PUSCH duration of the activated CG may not be used for initial transmission before the configured grant timer expires.

FIG. 1 includes a diagram 100 illustrating a scenario in which a PUSCH duration indicated by a DG overlaps with another PUSCH duration of an activated CG according to an example implementation of the present disclosure. The PUSCH duration 110 of an activated CG is associated with a HARQ process ID #1. The PUSCH duration 120 indicated by a DG is associated with a HARQ process ID #2. The PUSCH duration 110 overlaps with the PUSCH duration 120 in the time domain.

The MAC entity/HARQ entity may confirm that an initial/new transmission of PUSCH with the HARQ process ID #1 on the activated CG is prohibited because a CG timer corresponding to the HARQ process ID #1 is still running. In this case, the MAC entity/HARQ entity may prioritize the PUSCH 120 indicated by the DG. In contrast, if the MAC entity/HARQ entity confirms that the CG timer for the HARQ process ID #1 is either not running or not configured, further prioritizations may be made based on implementations in case 2-2.

In one implementation, the MAC entity/HARQ entity may directly determine whether the CG timer for the HARQ process of the PUSCH duration of the activated CG is running and the PUSCH duration of the activated CG conflicts (e.g., partially or fully overlaps in the time domain) with the PUSCH duration indicated by the DG. If the CG timer for the HARQ process of the PUSCH duration of the activated CG is running, the MAC entity/HARQ entity may prioritize the PUSCH duration indicated by the DG. In contrast, if the MAC entity/HARQ entity confirms that the CG timer for the HARQ process of the PUSCH duration of the activated CG is not running when conflict occurs, further prioritizations may be made based on implementations in case 2.2. In one implementation, a prioritization decision performed by the MAC entity/HARQ entity may follow implementations in case 2.2 directly, without performing methods in case 2.1, when the MAC entity/HARQ entity identifies that a resource conflict occurs between a PUSCH duration of an activated CG and a PUSCH duration indicated by a DG.

Case 2-2: Prioritization Based on Priorities of Logical Channels

If the MAC entity/HARQ entity identifies that a resource conflict in the time domain occurs between a PUSCH duration of an activated CG and a PUSCH duration indicated by a DG in the same serving cell, the MAC entity/HARQ entity may perform prioritization in order to select one of the conflicting PUSCH durations for transmission. The prioritization decision may be performed by comparing the LCH priorities (e.g., a parameter priority configured in an IELogicalChannelConfig, where an increasing priority value indicates a lower priority level) among all LCHs categorized as $LCH_{conflictingPUSCH}$.

An LCH may be categorized as $LCH_{conflictingPUSCH}$ if the LCH includes available data and can be mapped to at least one of the conflicting PUSCH durations. Any LCH with available data, which satisfies the LCP mapping restriction to an (DG or CG) UL grant that indicates or corresponds to a conflicting PUSCH duration, may be categorized as $LCH_{conflictingPUSCH}$ in the present disclosure. For example, two PUSCH durations from the same serving cell, specifically PUSCH #1 and PUSCH #2, overlap in the time domain. Moreover, the LCP mapping restrictions of PUSCH #1 and PUSCH #2 can be satisfied by LCH #1 and LCH #2, respectively, during the LCH selection stage of the LCP procedure. In this case, LCH #1 and LCH #2 may be both categorized as $LCH_{conflictingPUSCH}$ if they both include available data. PUSCH #1 and PUSCH #2 may be said to be mapped to LCH #1 and LCH #2, respectively. Each configured LCH may be associated with one or more LCP mapping restrictions via a configuration (e.g., in the IE LogicalChannelConfig) from a BS. Data from an LCH may only be transmitted on a PUSCH duration corresponding to an UL grant that satisfies all the LCP mapping restrictions associated with the LCH.

In one implementation, the MAC entity/HARQ entity may prioritize the PUSCH duration that maps to the LCH with the highest priority among all LCHs categorized as $LCH_{conflictingPUSCH}$. In one implementation, before the UE generates a MAC PDU for transmission on a PUSCH duration (e.g., the PUSCH duration is scheduled for an initial transmission), the UE may obtain a set of LCHs with data available for transmission, where the data from the set of LCHs are to be mapped to the PUSCH duration according to the LCP restriction(s) configured to the UE.

Table 1 illustrates mapping between PUSCH durations and LCHs. PUSCH #1 is mapped to two LCHs with available data, including LCH #1 and LCH #3, having a priority value of 1 and 3, respectively. PUSCH #2 is mapped to two LCHs with available data, including LCH #2 and LCH #4, having a priority value of 2 and 4, respectively. LCH #1, LCH #2, LCH #3 and LCH #4 may be all categorized as $LCH_{conflictingPUSCH}$. PUSCH #1 may then be prioritized over PUSCH #2 if these two PUSCH durations conflict because LCH #1 has the highest priority among all LCHs categorized as $LCH_{conflictingPUSCH}$.

TABLE 1 mapping between PUSCH durations and LCHs

| PUSCH duration | Mapped LCH with available data |
|---|---|
| PUSCH #1 | LCH #1 (priority = 1), LCH #3 (priority = 3) |
| PUSCH #2 | LCH #2 (priority = 2), LCH #4 (priority = 4) |

In one implementation, the MAC entity/HARQ entity may prioritize the PUSCH duration that corresponds to a MAC service data unit (SDU) (e.g., the MAC SDU is from a MAC PDU that may be transmitted on this PUSCH duration) containing data from the LCH with the highest priority among all LCHs categorized as $LCH_{conflictingPUSCH}$. In one implementation, a MAC PDU (which may include one or more MAC SDUs) for transmission on a PUSCH duration may have already been generated when prioritization needs to be performed (e.g., the PUSCH duration is scheduled for a retransmission and a MAC PDU has already been generated and stored in the HARQ buffer of the identified HARQ process of this PUSCH duration). In one implementation, the UE may obtain a set of LCHs from at least one MAC SDU that corresponds to the PUSCH duration, where the at least one MAC SDU includes data from the set of LCHs.

In one example, two PUSCH durations that are both scheduled for retransmission overlap in the time domain. Moreover, the MAC PDUs corresponding to both PUSCH durations may have already been generated and stored in the associated HARQ buffers when prioritization needs to be performed by the MAC entity/HARQ entity. Moreover, one or more MAC SDUs may be included in the MAC PDUs corresponding to the overlapping PUSCH durations. In this example, the MAC entity/HARQ entity may prioritize the PUSCH duration that corresponds to a MAC SDU containing data from the LCH having the highest priority (e.g., the LCH configured with the lowest priority value) among all LCHs with data included in the MAC SDUs of the overlapping PUSCH durations.

In another example, PUSCH #1 is mapped to two LCHs with available data, including LCH #1 and LCH #3, having a priority value of 1 and 3, respectively. PUSCH #2 is mapped to two LCHs with available data, including LCH #2 and LCH #4, having a priority value of 2 and 4, respectively. LCH #1, LCH #2, LCH #3 and LCH #4 may be all categorized as $LCH_{conflictingPUSCH}$ in this example. However, the MAC PDU to be transmitted on PUSCH #1 may not include a MAC SDU that contains data from the two associated LCHs (i.e., LCH #1 and LCH #3) due to a limited grant size such that PUSCH #1 may include neither data from LCH #1 nor data from LCH #3.

Moreover, the MAC PDU to be transmitted on PUSCH #2 may include a MAC SDU which contains data from LCH #2. In this example, PUSCH #2 may then be prioritized over PUSCH #1 because PUSCH #2 includes a MAC SDU containing data from the LCH with the highest priority (LCH #2) among all LCHs categorized as $LCH_{conflictingPUSCH}$. In one implementation, if the MAC PDU to be transmitted on a PUSCH duration does not include any MAC SDU (e.g., the MAC PDU does not include data from any LCH), the PUSCH duration may be considered as having the lowest priority when prioritization is performed by the MAC entity/HARQ entity.

Figure 2:
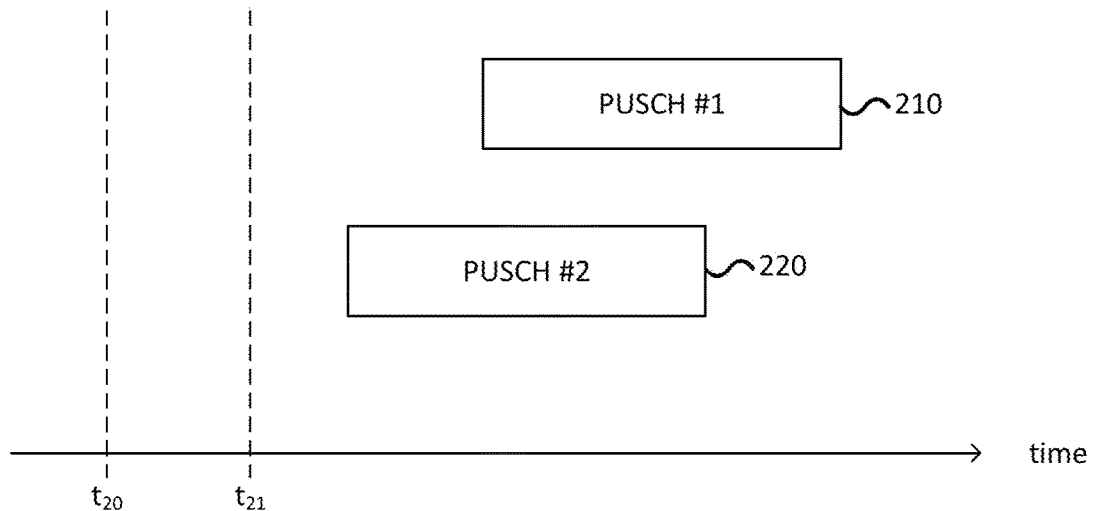
FIG. 2 includes a diagram illustrating a prioritization decision related to overlapping PUSCH durations according to an example implementation of the present disclosure.

FIG. 2 includes a diagram 200 illustrating a prioritization decision between two overlapping PUSCH durations according to an example implementation of the present disclosure. PUSCH #1 210 overlaps with PUSCH #2 220 in the time domain. In one example, PUSCH #1 210 and PUSCH #2 220 may both be used for initial transmissions. The UE has not generated a MAC PDU for either PUSCH duration before time $t_{20}$. At time $t_{20}$, the UE may prioritize the PUSCH duration that maps to the LCH with the highest priority among all LCHs categorized as $LCH_{conflictingPUSCH}$ (e.g., PUSCH #1 210). At time $t_{21}$, the UE may generate a new MAC PDU for the initial transmission on PUSCH #1 210.

In another example, PUSCH #1 210 and PUSCH #2 220 may both be used for retransmissions. MAC PDUs corresponding to PUSCH #1 210 and PUSCH #2 220 have been already generated before time $t_{20}$ and each of the MAC PDUs has been transmitted on a previously scheduled PUSCH with the same HARQ process as PUSCH #1 210 and PUSCH #2 220, respectively. At time $t_{20}$, the UE may prioritize the PUSCH duration used for transmitting a MAC PDU that includes a MAC SDU containing data from the LCH with the highest priority among all LCHs categorized as $LCH_{conflictingPUSCH}$. In this example, PUSCH #2 220 may be prioritized. At time $t_{21}$, the UE may request a retransmission for the MAC PDU on the prioritized PUSCH duration, e.g., PUSCH #2 220.

Case 2-3: Other Prioritization Methods

There may be no available data in any LCH that maps to at least one of the conflicting PUSCH durations (e.g., no LCH is categorized as $LCH_{conflictingPUSCH}$) or none of the MAC PDUs for transmission on the conflicting PUSCH durations may include a MAC SDU, possibly due to a limited grant size. The MAC entity/HARQ entity may prioritize the PUSCH duration indicated by the DG if skipUplinkTxDynamic is configured with a value of TRUE (and skipUplinkTxSPS is not configured).

The UE may skip UL transmissions for an UL grant other than a configured UL grant if it is configured with skipUplinkTxSPS and there is no data available for transmission in the UE buffer. On the other hand, the MAC entity/HARQ entity may prioritize the PUSCH duration that corresponds to an activated CG if skipUplinkTxSPS is configured with a value of TRUE (and skip UplinkTxDynamic is not configured).

In one implementation, the MAC entity/HARQ entity may prioritize the PUSCH duration that is allocated for aperiodic channel state information (CSI) transmission. In one implementation, the MAC entity/HARQ entity may prioritize the PUSCH duration that corresponds to the smallest configured number of repetitions. In one implementation, the MAC entity/HARQ entity may prioritize the PUSCH duration that corresponds to the largest configured number of repetitions. The number of repetitions may be configured via RRC signaling or dynamically indicated in an UL grant. For example, when further prioritization is required between a PUSCH duration indicated by a DG and a PUSCH duration of an activated CG, and repK from an IE ConfiguredGrant-Config and pusch-AggregationFactor from an IE PUSCH-Config are configured as n4 and n8 (n4<n8), respectively, the UE may prioritize the PUSCH duration of the activated CG.

In one implementation, the MAC entity/HARQ entity may prioritize the PUSCH duration that can accommodate a specific type of MAC CE (e.g., if the MAC PDU to be transmitted on the PUSCH duration includes a specific type of MAC CE). The specific type of MAC CE may be preconfigured or indicated by a BS. In one implementation, the specific type of MAC CE may be a BSR MAC CE. In one implementation, the specific type of MAC CE may be a Beam Failure Recovery Request (BFRQ) MAC CE, which may be an UL MAC CE transmitted from the UE to the BS for indicating beam failure related information (of a secondary cell (SCell)). Once a (SCell) beam failure recovery procedure is triggered, the MAC entity of the UE may send the BFRQ MAC CE via a PUSCH resource to a serving BS. In one implementation, the specific MAC CE may be a MAC CE with the highest configured priority. The priority of the MAC CE may be configured by the network via an RRC message or DCI signaling.

In one implementation, The MAC entity/HARQ entity may prioritize the PUSCH duration that corresponds to the smallest payload size or TB size. In one implementation, the MAC entity/HARQ entity may prioritize the PUSCH duration that corresponds to the smallest PUSCH duration.

In one implementation, The MAC entity/HARQ entity may prioritize the PUSCH duration with the earliest starting time or the earliest ending time. It should be noted that case 2-3 may also be applied to prioritize one PUSCH for transmission whenever a UE determines that resource conflict occurs as described in cases 1-1 through 1-3.

Case 3: Time at which Prioritization Decision is Performed

The prioritization decision in cases 2-1 through 2-3 may consider data availability of the LCH(s) that maps to the conflicting PUSCH durations. The exact point in time at which the prioritization decision is made may directly affect the prioritization outcome.

Figure 3:
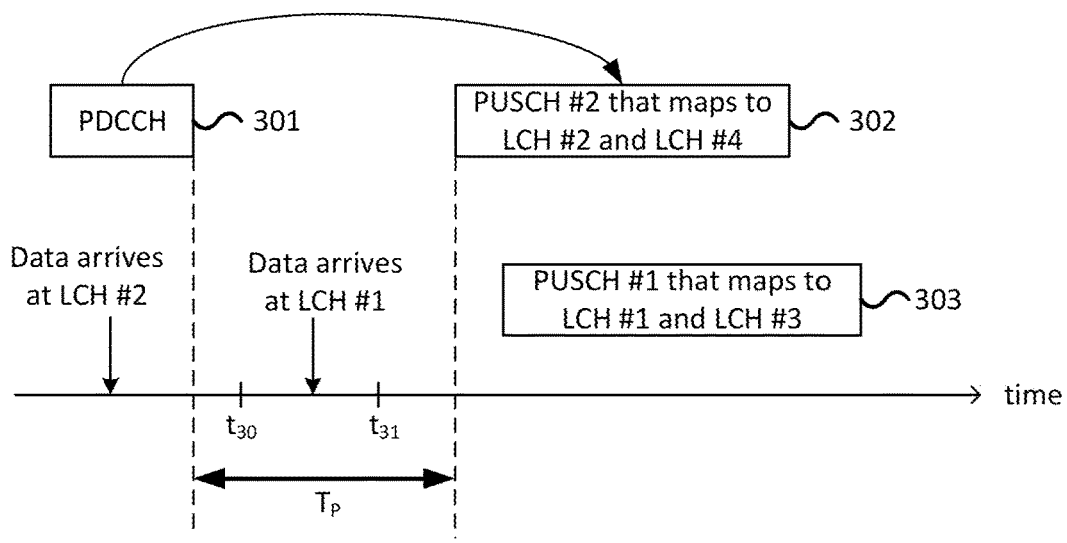
FIG. 3 includes a diagram illustrating a time at which the prioritization decision in FIG. 2 is made according to an example implementation of the present disclosure.

FIG. 3 includes a diagram 300 illustrating a time at which the prioritization decision is made according to an example implementation of the present disclosure. The UE receives a DG on PDCCH 301 that allocates PUSCH #2 302, which conflicts with PUSCH #1 303 of an activated CG. The UE may make the prioritization decision at any point in time within a period $T_P$ illustrated in FIG. 3 if the MAC entity ensures that there is enough time for MAC PDU generation after the prioritization decision has been made (the DCI decoding time is not considered).

In this example, LCH #1 (priority=1) and LCH #3 (priority=3) are mapped to PUSCH #1 303. LCH #2 (priority=2) and LCH #4 (priority=4) are mapped to PUSCH #2 302. The prioritization decision made at time $t_{30}$ and $t_{31}$ may have different results if LCH #2 has pending data available for transmission before time $t_{30}$ whereas data corresponding to LCH #1 arrives between $t_{30}$ and $t_{31}$. In this example, the MAC entity/HARQ entity may prioritize PUSCH #2 302 indicated by PDCCH 301 if the prioritization decision is made at time $t_{30}$. However, the MAC entity/HARQ entity may prioritize PUSCH #1 303 of the activated CG if the prioritization decision is made at time $t_{31}$.

In case 3, timing information related to when the prioritization decision is made may be preconfigured, configured by a BS via RRC signaling or indicated via a DCI field. The timing information may indicate a time period or an exact point in time at which the prioritization decision may be performed by the MAC entity/HARQ entity when a resource conflict between multiple PUSCHs occurs. In one implementation, if the timing information is configured by the BS, the timing information may be configured per UL/DL bandwidth part (BWP), per serving cell, per serving cell group or per UE. The MAC entity/HARQ entity may obtain/generate the MAC PDU from a multiplexing and assembly procedure after the prioritization decision has been made.

Case 3-1: T1 after the End of the PDCCH that Schedules the PUSCH.

Figure 4:
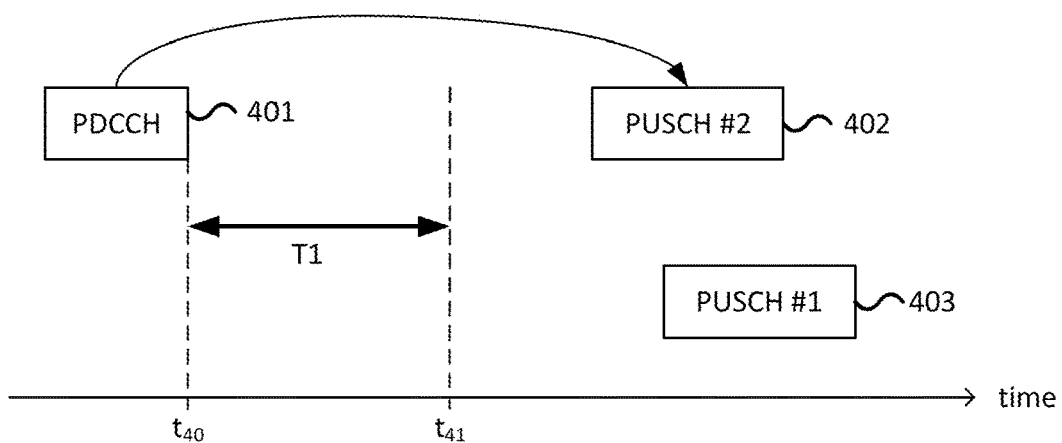
FIG. 4 includes a diagram illustrating a time period during which the prioritization decision in FIG. 2 is made according to an example implementation of the present disclosure.

FIG. 4 includes a diagram 400 illustrating a time period T1 related to the time at which the prioritization decision is made according to an example implementation of the present disclosure. The UE receives a DG on PDCCH 401 that allocates PUSCH #2 402, which conflicts with PUSCH #1 403 (e.g., a PUSCH duration of an activated CG).

In one implementation, the MAC entity/HARQ entity may perform the prioritization decision at time $t_{41}$, which is a time period T1 after the end of the reception of PDCCH 403 (at time $t_{40}$) that carries the DCI scheduling PUSCH #2 402. In one implementation, the MAC entity/HARQ entity may perform the prioritization decision starting from the time period T1 after the end of the reception of PDCCH 403 (e.g., starting from time $t_{41}$). In one implementation, the MAC entity/HARQ entity may perform multiple prioritization decisions during the time period T1. In one implementation, the MAC entity/HARQ entity may obtain/generate the MAC PDU from the multiplexing and assembly procedure after the prioritization decision has been made.

In one implementation, the value of the time period T1 may be determined based on at least one preconfigured lookup table. The lookup table may map different values of T1 to different UL subcarrier spacings (SCS) corresponding to the indicated PUSCH duration or different DL SCS corresponding to the PDCCH scheduling the PUSCH duration. In one implementation, there may be different lookup tables corresponding to different UE processing capabilities. In one implementation, the UE processing capability may be the PUSCH timing capability. In one implementation, the time period T1 may be configured in unit of symbol, slot or millisecond. Table 2-A and Table 2-B illustrate two lookup tables for two different UE processing capabilities, with each table having a mapping between different T1 values and different SCS.

TABLE 2-A

| T1 | SCS |
|---|---|
| T1_1a | 15 kHz |
| T1_2a | 30 kHz |
| T1_3a | 60 kHz |

TABLE 2-B

| T1 | SCS |
|---|---|
| T1_1b | 15 kHz |
| T1_2b | 30 kHz |
| T1_3b | 60 kHz |

In one implementation, the value of T1 may be based on a service type. ABS may configure multiple T1 values corresponding to multiple service types to a UE that supports multiple service types. For example, the BS may configure a set of T1 values that includes a T1 value for URLLC and a T1 value for eMBB to the UE supporting both the eMBB and URLLC services. The UE may determine the timing for the prioritization decision based on the largest or the smallest service-based T1 value in the set configured by the BS.

Case 3-2: T2 Before Transmission on the Earliest PUSCH Duration.

Figure 5:
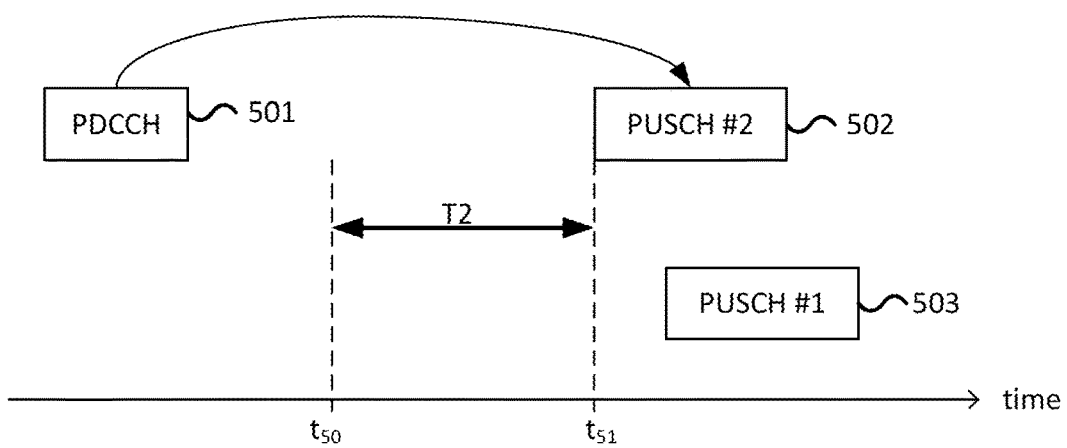
FIG. 5 includes a diagram illustrating a second time period during which the prioritization decision in FIG. 2 is made according to an example implementation of the present disclosure.

FIG. 5 includes a diagram 500 illustrating a time period T2 related to the time at which the prioritization decision is made according to an example implementation of the present disclosure. The UE receives a DG on PDCCH 501 that allocates PUSCH #2 502, which conflicts with PUSCH #1 503 (e.g., a PUSCH duration of an activated CG).

In one implementation, the MAC entity/HARQ entity may perform prioritization at a time $t_{50}$, which is a time period T2 before the transmission on the PUSCH duration that has the earliest starting time (at time $t_{51}$) among all conflicting PUSCH durations in the same cell. In one implementation, the MAC entity/HARQ entity may perform multiple prioritization decisions during the time period T2. In one implementation, the MAC entity/HARQ entity may obtain/generate the MAC PDU from the multiplexing and assembly procedure after the prioritization decision has been made.

In one implementation, the value of the time period T2 may be determined in a similar way to the time period T1. For example, the time period T2 may depend on at least one of the SCS, the UE processing capability, and the service type. The time period T2 may be configured in unit of symbol, slot or millisecond.

Case 3-3: T3 Before Transmission on the Latest PUSCH Duration.

Figure 6:
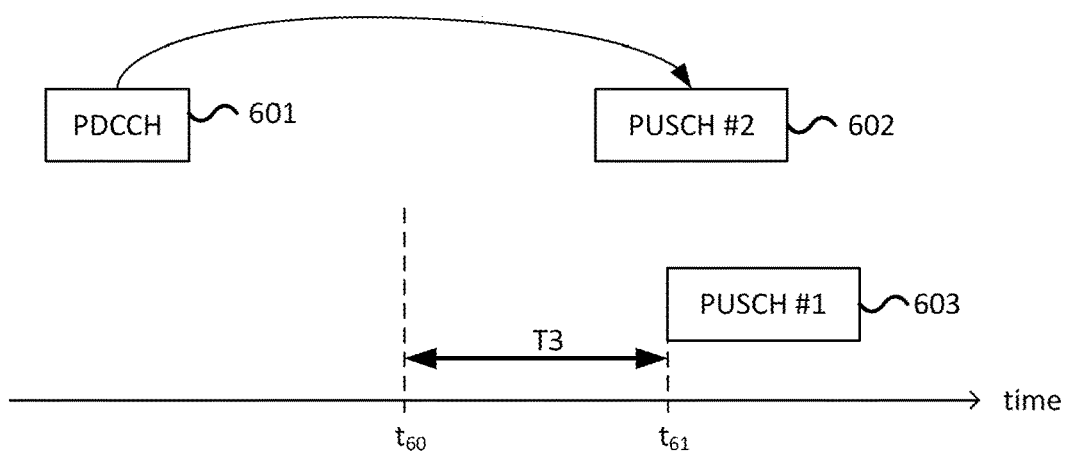
FIG. 6 includes a diagram illustrating a third time period during which the prioritization decision in FIG. 2 is made according to an example implementation of the present disclosure.

FIG. 6 includes a diagram 600 illustrating a time period T3 related to the time at which the prioritization decision is made according to an example implementation of the present disclosure. The UE receives a DG on PDCCH 601 that allocates PUSCH #2 602, which conflicts with PUSCH #1 603 (e.g., a PUSCH duration of an activated CG).

In one implementation, the MAC entity/HARQ entity may perform prioritization decision at a time $t_{60}$, which is a time period T3 before the transmission on the PUSCH duration that has the latest starting time (at time $t_{61}$) among all conflicting PUSCH durations in the same cell. In one implementation, the MAC entity/HARQ entity may perform multiple prioritization decisions during the time period T3. In one implementation, the MAC entity/HARQ entity may obtain/generate the MAC PDU from the multiplexing and assembly procedure after the prioritization decision has been made. In one implementation, the value of the time period T3 may be determined in a similar way to the time period T1. For example, the time period T3 may depend on at least one of the SCS, the UE processing capability, and the service type. The time period T3 may be configured in unit of symbol, slot or millisecond.

Case 4: UE Behavior Upon Intra-UE UL Prioritization

In one embodiment, if two PUSCH durations from the same serving cell partially/fully overlap in the time domain, an LCP procedure may be started after the MAC entity/HARQ entity selects a PUSCH duration based on the prioritization decision in cases 2-1 through 2-3. The LCP procedure may take place in a multiplexing and assembly entity. After the LCP procedure, the MAC entity/HARQ entity generates/obtains the MAC PDU/TB from the multiplexing and assembly entity.

When data becomes available at an LCH that maps to at least one of the conflicting PUSCH durations, the MAC entity/HARQ entity may perform prioritization by comparing "the priority of the LCH with incoming data" and "the priority of the highest-priority data that has been included in the generated MAC PDU" (or "the priority of the highest-priority data that will be included in the MAC PDU"). The priority of the data may refer to the priority of the LCH from which the data comes.

In one implementation, the prioritization decision in cases 2-1 through 2-3 may be performed multiple times before an actual transmission on the selected PUSCH duration. In one implementation, the MAC entity may send an indication to a multiplexing and assembly entity to cancel (drop/deprioritize/puncture) an ongoing LCP procedure and reinitiate a new LCP procedure if the MAC entity/HARQ entity determines that the prioritization outcome is changed, which results in a reselection of another PUSCH duration for transmission.

Figure 7:
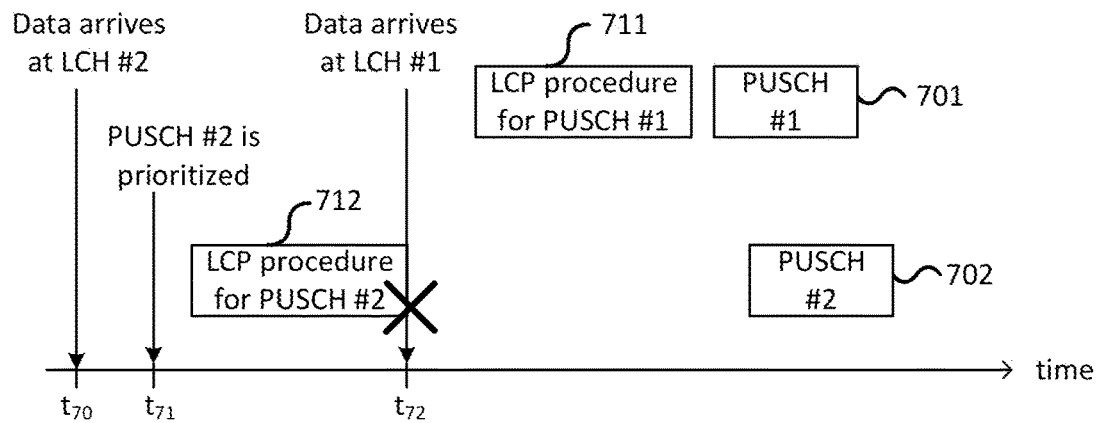
FIG. 7 includes a diagram illustrating a scenario in which an LCP procedure according to an example implementation of the present disclosure.

FIG. 7 includes a diagram 700 illustrating a scenario in which an LCP procedure is cancelled according to an example implementation of the present disclosure. In this example, LCH #1 (priority=1) and LCH #3 (priority=3) are mapped to PUSCH #1 701. LCH #2 (priority=2) and LCH #4 (priority=4) are mapped to PUSCH #2 702. PUSCH #1 701 overlaps PUSCH #2 702 in the time domain. Data arrives at LCH #2 at time $t_{70}$. At time $t_{71}$, the MAC entity/HARQ entity may prioritize PUSCH #2 702 over PUSCH #1 701 because LCH #2 has the highest priority among all LCHs categorized as $LCH_{conflictingPUSCH}$ (LCH #1 has no available data at time $t_{71}$). The UE may perform an LCP procedure 712 to generate a MAC PDU corresponding to PUSCH #2 702. When data arrives at LCH #1 at time $t_{72}$, the MAC entity/HARQ entity may prioritize PUSCH #1 701 over PUSCH #2 702 because now LCH #1 has the highest priority among all LCHs categorized as $LCH_{conflictingPUSCH}$. Since the prioritization outcome is changed, the UE may cancel the ongoing LCP procedure 712 and reinitiate a new LCP procedure 711 to generate a MAC PDU corresponding to PUSCH #1 701.

In one implementation, if a PHY layer receives a TB (denoted as TB1) or a MAC

PDU from a MAC entity/HARQ entity of the UE, the PHY layer may check whether a PUSCH duration to which TB1 corresponds (denoted as PUSCH1) partially or fully overlaps in the time domain with any other PUSCH duration scheduled by the BS in the same serving cell. In one implementation, the PHY layer may receive the TB1/MAC PDU from the MAC entity/HARQ entity after the MAC entity/HARQ entity obtains/generates the MAC PDU or TB1 from the multiplexing and assembly entity and instructs the PHY layer to perform transmission of the MAC PDU or TB1.

If there are overlapping PUSCH durations, the PHY layer may check whether the TB(s) corresponding to the PUSCH duration(s) that conflict(s) with PUSCH1 has already been received from the MAC entity. If so, the PHY layer may discard the already received TB(s) other than TB1.

Figure 8:
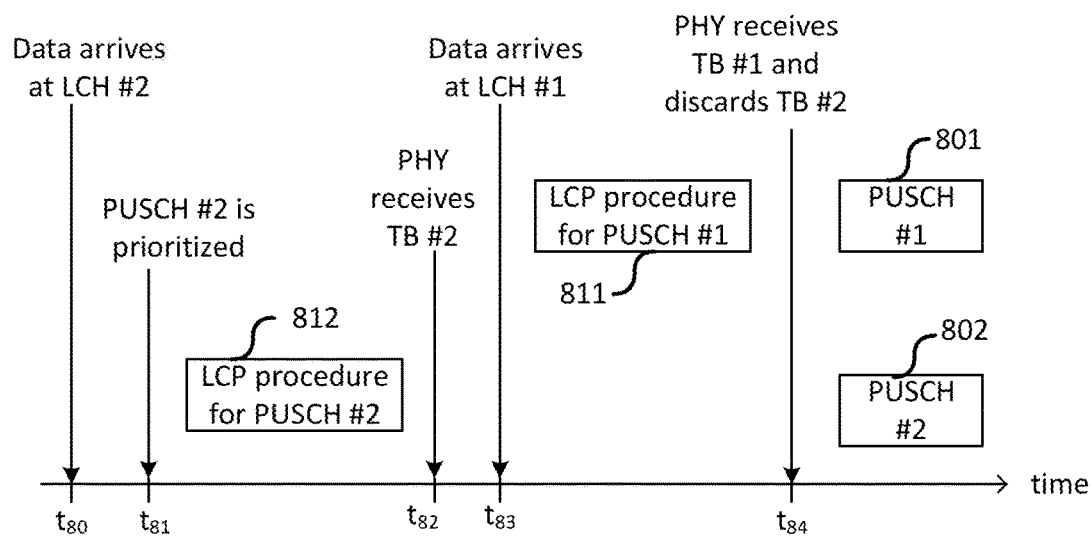
FIG. 8 includes a diagram illustrating a scenario in which a previously received Transport Block (TB) is discarded according to an example implementation of the present disclosure.

FIG. 8 includes a diagram 800 illustrating a scenario in which a previously received TB is discarded according to an example implementation of the present disclosure. In this example, LCH #1 (priority=1) and LCH #3 (priority=3) are mapped to PUSCH #1 801. LCH #2 (priority=2) and LCH

4 (priority=4) are mapped to PUSCH #2 802. PUSCH #1 801 overlaps PUSCH #2 802 in the time domain.

Data arrives at LCH #2 at time $t_{80}$. At time $t_{81}$, the MAC entity/HARQ entity may prioritize PUSCH #2 802 over PUSCH #1 801.

The UE (e.g., the MAC entity of the UE) may perform an LCP procedure 812 to generate a MAC PDU corresponding to PUSCH #2 802. The MAC entity may deliver the generated MAC PDU to the PHY layer after completion of the LCP procedure 812.

The PHY layer receives TB #2 corresponding to the MAC PDU generated in the LCP procedure 812 at time $t_{82}$. When data arrives at LCH #1 at time $t_{83}$, the MAC entity/HARQ entity may then prioritize PUSCH #1 801 over PUSCH #2 802. The UE (e.g., the MAC entity of the UE) may perform an LCP procedure 811 to generate a MAC PDU corresponding to PUSCH #1 801.

The PHY layer receives TB #1 corresponding to the MAC PDU generated in the LCP procedure 811 at time $t_{84}$. The PHY layer may check TB #2 corresponding to PUSCH #2 802 that conflicts with PUSCH #1 801 has already been received from the MAC entity, and the PHY layer may discard TB #2 received at time $t_{82}$.

In one implementation, if a DG indicating a PUSCH duration is received on a PDCCH and the indicated PUSCH duration partially or fully overlaps in the time domain with an ongoing PUSCH transmission in the same serving cell, the MAC entity/HARQ entity may ignore the prioritization and directly generate a MAC PDU corresponding to the PUSCH duration indicated by the DG. In one implementation, the DG may be addressed to C-RNTI, modulation coding scheme cell RNTI (MCS-C-RNTI), Temporary C-RNTI, CS-RNTI, or other types of RNTI.

In one implementation, if a PHY layer receives a MAC PDU/TB from a MAC entity/HARQ entity of the UE after the MAC entity/HARQ entity obtains/generates the MAC PDU/TB from the multiplexing and assembly entity and instructs PHY layer to perform transmission of the MAC PDU/TB, the PHY layer may check whether the received MAC PDU/TB corresponds to a PUSCH that partially or fully overlaps in the time domain with an ongoing PUSCH transmission in the same serving cell. If there are overlapping PUSCH durations, the PHY layer may immediately cancel (drop/deprioritize/puncture) the ongoing PUSCH transmission. In one implementation, if the PHY layer receives an UL grant indicating a PUSCH duration that partially or fully overlaps in the time domain with an ongoing PUSCH transmission in the same serving cell, the PHY layer may immediately cancel (drop/deprioritize/puncture) the ongoing PUSCH transmission.

Figure 9:
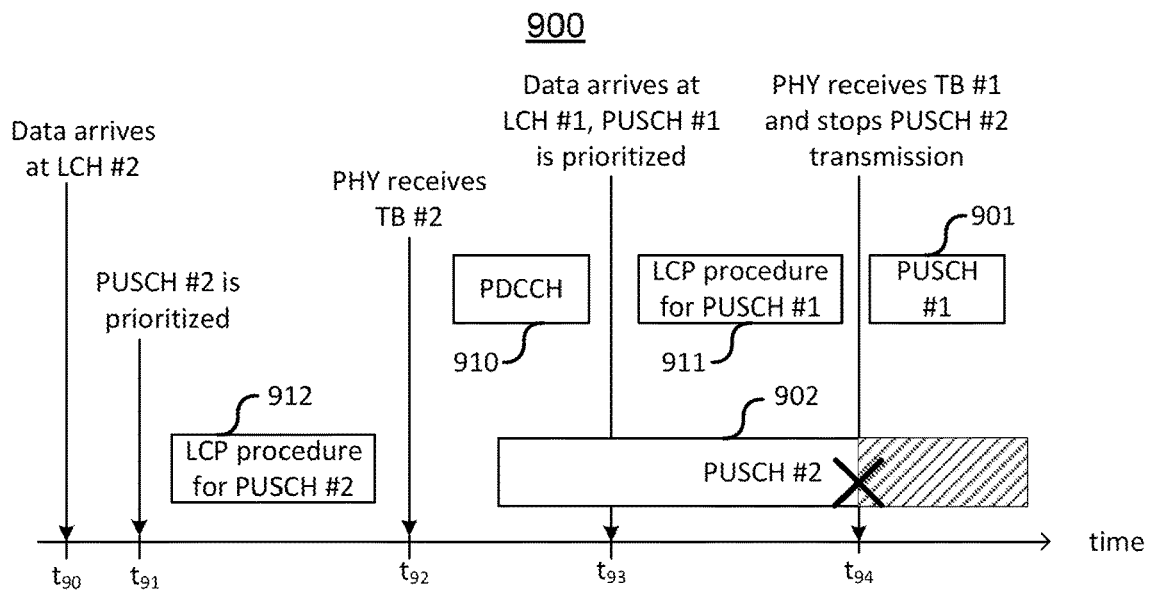
FIG. 9 includes a diagram illustrating a scenario in which an ongoing UL transmission is cancelled according to an example implementation of the present disclosure.

FIG. 9 includes a diagram 900 illustrating a scenario in which an ongoing UL transmission is cancelled according to an example implementation of the present disclosure. PUSCH #2 902 may correspond to an activated CG or may be scheduled by a DG. In this example, LCH #1 (priority=1) and LCH #3 (priority=3) are mapped to PUSCH #1 901. LCH #2 (priority=2) and LCH #4 (priority=4) are mapped to PUSCH #2 902.

Data arrives at LCH #2 at time $t_{90}$. At time $t_{91}$, the UE may determine that PUSCH #2 902 is prioritized.

The UE may then perform an LCP procedure 912 to generate a MAC PDU corresponding to PUSCH #2 902. The MAC entity may deliver the generated MAC PDU to the PHY layer after completing the LCP procedure 912 and instruct PHY to perform transmission of the generated MAC PDU. The PHY layer receives TB #2 corresponding to the MAC PDU generated in the LCP procedure 912 at time $t_{92}$.

The UE receives a DG on PDCCH 910 that schedules PUSCH #1 901. The UE may then determine PUSCH #1 901 overlaps with PUSCH #2 902 in the time domain. A prioritization decision between PUSCH #1 901 and PUSCH #2 902 may refer to cases 2-1 through 2-3.

In one implementation, PUSCH #1 901 may be scheduled for retransmission. The UE may obtain a first set of LCHs from at least one first MAC SDU corresponding to PUSCH #2 902, where the at least one first MAC SDU includes data from the first set of LCHs (e.g., LCH #2 and LCH #4). The UE may also obtain a second set of LCHs from at least one second MAC SDU corresponding to PUSCH #1 901, where the at least one second MAC SDU includes data from the second set of LCHs (e.g., LCH #1 and LCH #3).

The UE may determine that the second set of LCHs includes an LCH that has the highest priority (e.g., LCH #1) among all LCHs in the first set of LCHs and the second set of LCHs. Therefore, the UE may determine that PUSCH #1 901 is prioritized over PUSCH #2 902.

In one implementation, PUSCH #1 901 may be scheduled for an initial transmission. For example, data arrives at LCH #1 at time $t_{93}$. The UE may obtain a first set of LCHs from at least one first MAC SDU corresponding to PUSCH #2 902, where the at least one first MAC SDU includes data from the first set of LCHs (e.g., LCH #2 and LCH #4). The UE may obtain a second set of LCHs with data available for transmission (e.g., LCH #1 and LCH #3), where the data from the second set of LCHs are to be mapped to PUSCH #1 901 according to an LCP restriction configured to the UE. The UE may determine that the second set of LCHs includes an LCH that has the highest priority (e.g., LCH #1) among all LCHs in the first set of LCHs and the second set of LCHs. Therefore, the UE may determine PUSCH #1 901 is prioritized over PUSCH #2 902.

In one implementation, PUSCH #2 902 may be scheduled by a CG. The UE may determine that a configured grant timer associated with the HARQ process of PUSCH #2 902 is running, and therefore determine that PUSCH #1 901 is prioritized over PUSCH #2 902.

In one implementation, the UE may determine that PUSCH #1 901 is prioritized over PUSCH #2 902 starting from a preconfigured time period T1 after the end of PDCCH 910 that schedules PUSCH #1 901. The preconfigured time period T1 is according to case 3-1.

After prioritizing PUSCH #1 901, the UE may perform an LCP procedure 911 to generate a MAC PDU corresponding to PUSCH #1 901. The PHY layer receives TB #1 corresponding to the MAC PDU generated by the LCP procedure 911 at time $t_{94}$. The UE (e.g., the PHY layer of the UE) may then cancel the ongoing UL transmission on PUSCH #2 902.

In one implementation, the UE may cancel the ongoing UL transmission on PUSCH #2 902 starting from a preconfigured time period T1 after the end of PDCCH 910 that schedules PUSCH #1 901. The preconfigured time period T1 is according to case 3-1.

Figure 10:
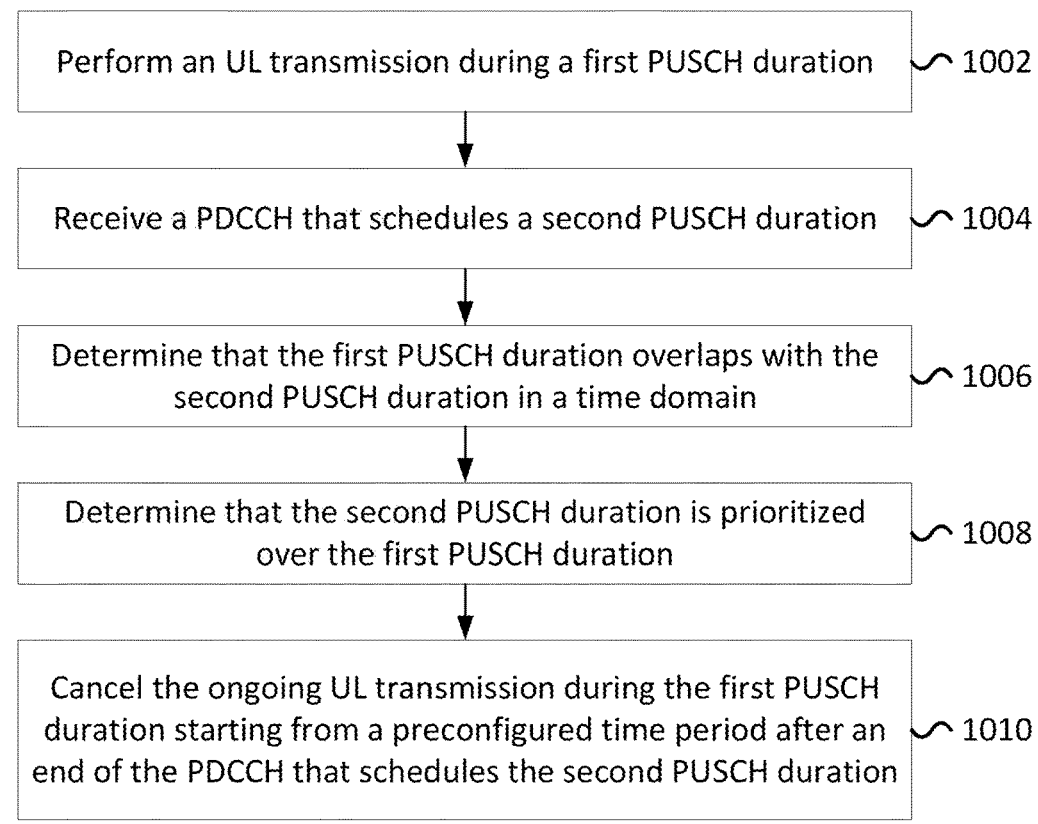
FIG. 10 is a flowchart of a method for UL transmission according to an example implementation of the present disclosure.

FIG. 10 is a flowchart of a method 1000 for UL transmission according to an example implementation of the present disclosure. In action 1002, the UE may perform an UL transmission on a first PUSCH duration. In action 1004, the UE may receive a PDCCH that schedules a second PUSCH duration. In action 1006, the UE may determine that the first PUSCH duration overlaps the second PUSCH duration in a time domain. In action 1008, the UE may determine that the second PUSCH duration is prioritized over the first PUSCH duration. The prioritization decision made in action 1008 may depend on cases 2-1 through 2-3.

Figure 11:
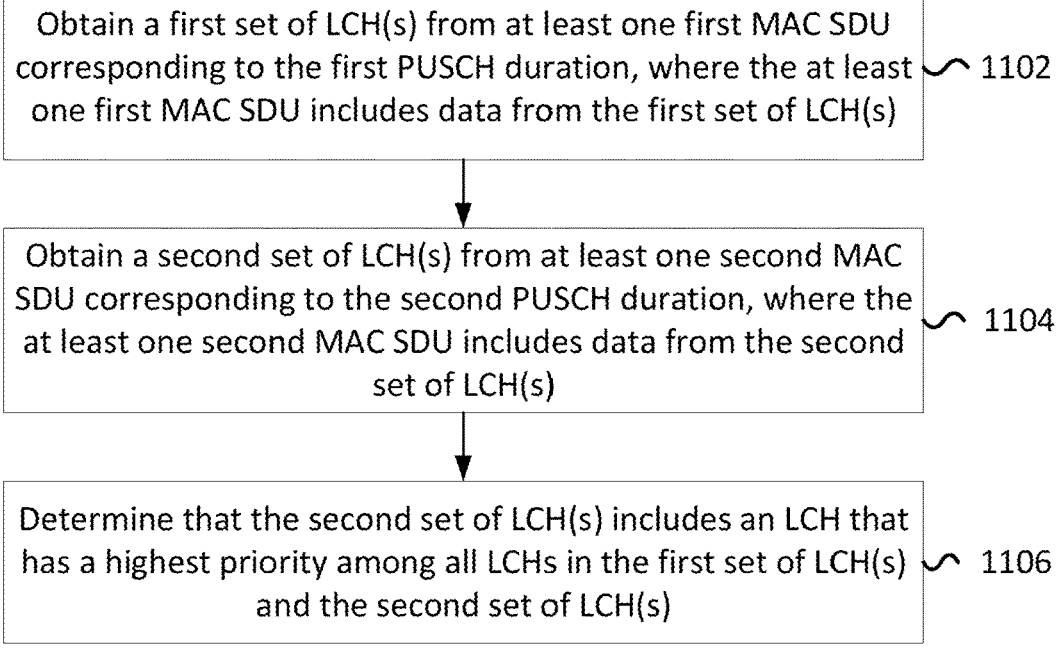
FIG. 11 is a flowchart of a method for prioritizing a second PUSCH duration scheduled for an UL retransmission according to an example implementation of the present disclosure.
Figure 12:
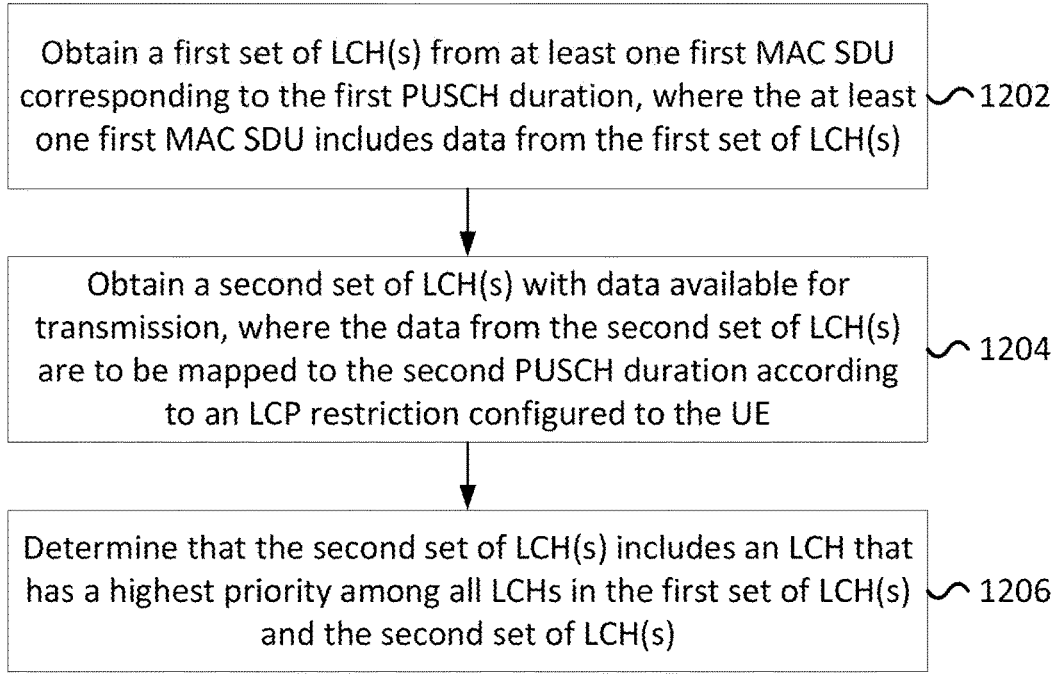
FIG. 12 is a flowchart of a method for prioritizing a second PUSCH duration scheduled for an initial UL transmission according to an example implementation of the present disclosure.

Implementations of action 1008 are provided in flowcharts illustrated in FIG. 11 and FIG. 12.

In action 1010, the UE may cancel the ongoing UL transmission during the first PUSCH duration starting from a preconfigured time period after an end of the PDCCH that schedules the second PUSCH duration. The preconfigured time period in action 1010 may be according to case 3-1.

FIG. 11 is a flowchart of a method 1100 for prioritizing the second PUSCH duration when the second PUSCH duration is scheduled for a retransmission according to an example implementation of the present disclosure. In action 1102, the UE may obtain a first set of LCH(s) from at least one first MAC SDU corresponding to the first PUSCH duration, where the at least one first MAC SDU includes data from the first set of LCH(s). In action 1104, the UE may obtain a second set of LCH(s) from at least one second MAC SDU corresponding to the second PUSCH duration, where the at least one second MAC SDU includes data from the second set of LCH(s). In action 1106, the UE may determine that the second set of LCH(s) includes an LCH that has a highest priority among all LCHs in the first set of LCH(s) and the second set of LCH(s).

FIG. 12 is a flowchart of a method 1200 for prioritizing the second PUSCH duration when the second PUSCH duration is scheduled for an initial transmission according to an example implementation of the present disclosure. In action 1202, the UE may obtain a first set of LCH(s) from at least one first MAC SDU corresponding to the first PUSCH duration, where the at least one first MAC SDU includes data from the first set of LCH(s). In action 1204, the UE may obtain a second set of LCH(s) with data available for transmission, where the data from the second set of LCH(s) are to be mapped to the second PUSCH duration according to an LCP restriction configured to the UE. In action 1206, the UE may determine that the second set of LCH(s) includes an LCH that has a highest priority among all LCHs in the first set of LCH(s) and the second set of LCH(s).

Figure 13:
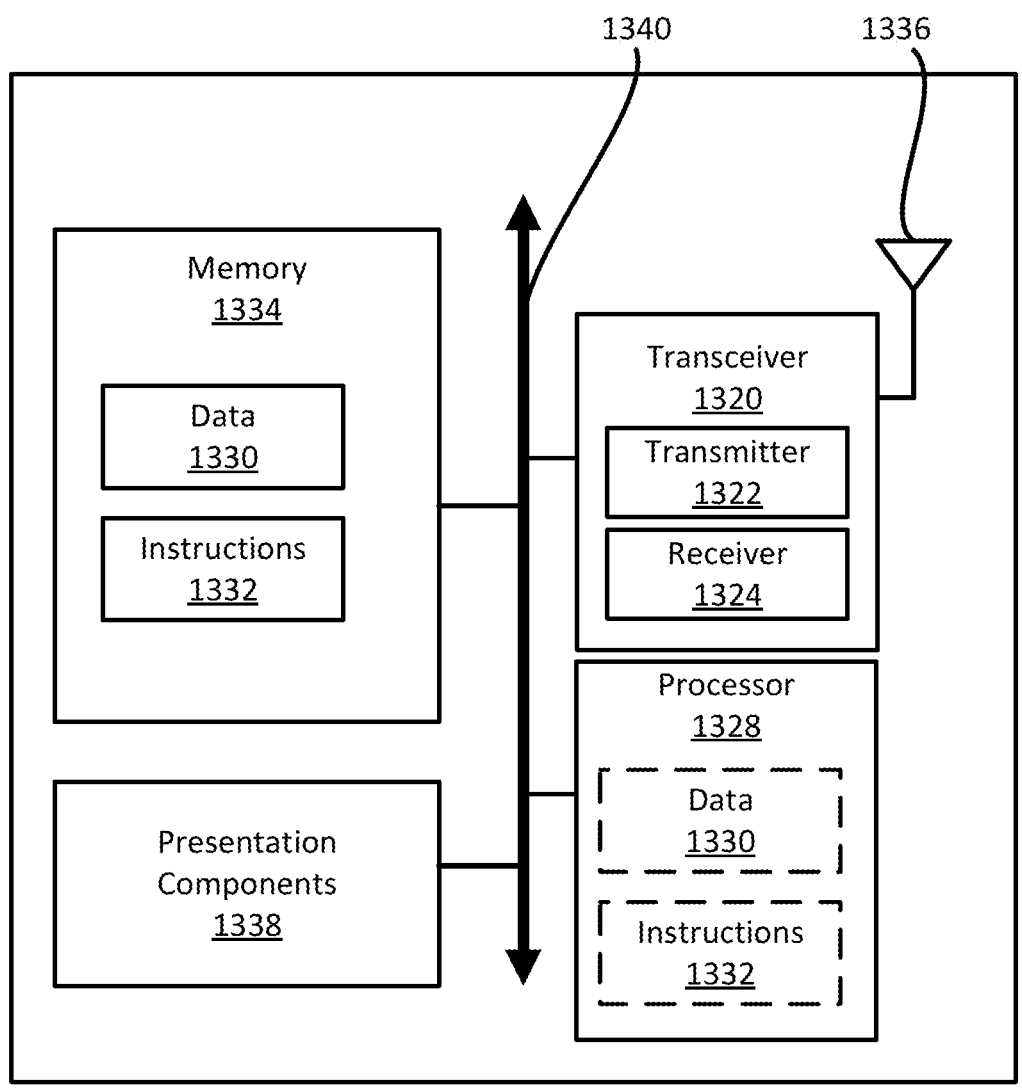
FIG. 13 is a block diagram illustrating a node for wireless communication in accordance with various aspects of the present disclosure.

FIG. 13 is a block diagram illustrating a node 1300 for wireless communication according to the present disclosure. As illustrated in FIG. 13, the node 1300 may include a transceiver 1320, a processor 1328, a memory 1334, one or more presentation components 1338, and at least one antenna 1336. The node 1300 may also include an RF spectrum band module, a BS communications module, a network communications module, and a system communications management module, Input/Output (I/O) ports, I/O components, and a power supply (not shown).

Each of the components may directly or indirectly communicate with each other over one or more buses 1340. The node 1300 may be a UE or a BS that performs various functions disclosed with reference to FIGS. 1 through 12.

The transceiver 1320 has a transmitter 1322 (e.g., transmitting/transmission circuitry) and a receiver 1324 (e.g., receiving/reception circuitry) and may be configured to transmit and/or receive time and/or frequency resource partitioning information. The transceiver 1320 may be configured to transmit in different types of subframes and slots including but not limited to usable, non-usable and flexibly usable subframes and slot formats. The transceiver 1320 may be configured to receive data and control channels.

The node 1300 may include a variety of computer-readable media. Computer-readable media may be any available media that may be accessed by the node 1300 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 1334 may include computer-storage media in the form of volatile and/or non-volatile memory. The memory 1334 may be removable, non-removable, or a combination thereof.

Example memory includes solid-state memory, hard drives, optical-disc drives, etc. As illustrated in FIG. 13, the memory 1334 may store computer-readable, computer-executable instructions 1332 (e.g., software codes) that are configured to cause the processor 1328 to perform various disclosed functions with reference to FIGS. 1 through 12. Alternatively, the instructions 1332 may not be directly executable by the processor 1328 but be configured to cause the node 1300 (e.g., when compiled and executed) to perform various functions disclosed herein.

The processor 1328 (e.g., having processing circuitry) may include an intelligent hardware device, e.g., a Central Processing Unit (CPU), a microcontroller, an ASIC, etc. The processor 1328 may include memory.

The processor 1328 may process the data 1330 and the instructions 1332 received from the memory 1334, and information transmitted and received via the transceiver 1320, the base band communications module, and/or the network communications module. The processor 1328 may also process information to be sent to the transceiver 1320 for transmission via the antenna 1336 to the network communications module for transmission to a core network.

One or more presentation components 1338 present data to a person or another device. Examples of presentation components 1338 include a display device, a speaker, a printing component, and a vibrating component.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts.

As such, the described implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) comprising:
one or more non-transitory computer-readable media containing computer-executable instructions embodied therein; and
at least one processor coupled to the one or more non-transitory computer-readable media, the at least one processor configured to execute the computer-executable instructions to:
perform an uplink (UL) transmission;
receive a physical downlink control channel (PDCCH) that schedules a first physical UL shared channel (PUSCH) duration;
determine that the UL transmission overlaps with the first PUSCH duration in a time domain;
determine that the first PUSCH duration is prioritized over the UL transmission; and
enable cancellation of the UL transmission after a preconfigured time period which starts at an end of the PDCCH that schedules the first PUSCH duration, wherein:
the preconfigured time period is determined by a value selected from a plurality of values in a preconfigured lookup table, and
each of the plurality of values in the preconfigured lookup table corresponds to one subcarrier spacing (SCS).

2. The UE of claim 1, wherein the at least one processor is further configured to execute the computer-executable instructions to determine that the first PUSCH duration which is prioritized over the UL transmission is transmitted after the preconfigured time period which starts at the end of the PDCCH that schedules the first PUSCH duration.

3. The UE of claim 1, wherein the first PUSCH duration is scheduled for a UL retransmission.

4. The UE of claim 1, wherein the first PUSCH duration is scheduled for an initial UL transmission.

5. The UE of claim 1, wherein the one SCS that corresponds to the selected value is associated with one of the first PUSCH duration and the PDCCH that schedules the first PUSCH duration.

6. The UE of claim 1, wherein:
the preconfigured lookup table is selected from a set of one or more preconfigured lookup tables,
each preconfigured lookup table in the set is associated with a specific processing capability, and
the selected preconfigured lookup table is associated with a current processing capability of the UE.

7. The UE of claim 1, wherein the at least one processor is further configured to execute the computer-executable instructions to disable the cancellation of the UL transmission starting from the end of the PDCCH that schedules the first PUSCH duration until the end of the preconfigured time period which starts at the end of the PDCCH that schedules the first PUSCH duration.

8. A method for uplink (UL) transmission performed by a user equipment (UE), the method comprising:
performing a UL transmission;
receiving a physical downlink control channel (PDCCH) that schedules a first physical UL shared channel (PUSCH) duration;
determining that the UL transmission overlaps with the first PUSCH duration in a time domain;
determining that the first PUSCH duration is prioritized over UL transmission; and
enabling cancellation of the UL transmission after a preconfigured time period which starts at an end of the PDCCH that schedules the first PUSCH duration, wherein:
the preconfigured time period is determined by a value selected from a plurality of values in a preconfigured lookup table, and
each of the plurality of values in the preconfigured lookup table corresponds to one subcarrier spacing (SCS).

9. The method of claim 8, further comprising determining that the first PUSCH duration which is prioritized over the UL transmission is transmitted after the preconfigured time period which starts at the end of the PDCCH that schedules the first PUSCH duration.

10. The method of claim 8, wherein the first PUSCH duration is scheduled for a UL retransmission.

11. The method of claim 8, wherein the first PUSCH duration is scheduled for an initial UL transmission.

12. The method of claim 8, wherein the one SCS that corresponds to the selected value is associated with one of the first PUSCH duration and the PDCCH that schedules the first PUSCH duration.

13. The method of claim 8, wherein:
the preconfigured lookup table is selected from a set of one or more preconfigured lookup tables,
each preconfigured lookup table in the set is associated with a specific processing capability, and
the selected preconfigured lookup table is associated with a current processing capability of the UE.

14. The method of claim 8, further comprising disabling the cancellation of the UL transmission starting from the end of the PDCCH that schedules the first PUSCH duration until the end of the preconfigured time period which starts at the end of the PDCCH that schedules the first PUSCH duration.

* * * * *